(12) United States Patent
Heidenreich et al.

(10) Patent No.: US 8,388,898 B2
(45) Date of Patent: Mar. 5, 2013

(54) CERAMIC FILTER ELEMENT

(75) Inventors: Steffen Heidenreich, Stimpfach (DE); Max-Eckhard Roessler, Moeckmuehl-Zuettlingen (DE); Astrid Walch, Kressberg (DE); Manfred Gutmann, Berlin (DE); Sven Chudzinski, Berlin (DE)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 12/946,889

(22) Filed: Nov. 16, 2010

(65) Prior Publication Data

US 2011/0058990 A1    Mar. 10, 2011

Related U.S. Application Data

(63) Continuation of application No. 10/332,582, filed as application No. PCT/EP01/08171 on Jul. 13, 2001, now abandoned.

(30) Foreign Application Priority Data

Jul. 13, 2000   (DE) .................................. 100 34 045

(51) Int. Cl.
   *B01D 51/00*    (2006.01)
(52) U.S. Cl. ........ 422/168; 422/177; 422/178; 502/439; 502/302; 502/243; 502/245; 502/241; 502/333; 502/331; 502/334; 502/335; 502/337; 502/339; 502/347; 502/350; 210/651; 423/239.1; 48/128
(58) Field of Classification Search .................. 422/168, 422/177, 178; 502/439; 423/239.1; 48/128, 48/127.9
See application file for complete search history.

(56) References Cited

U.S. PATENT DOCUMENTS

| | | | | |
|---|---|---|---|---|
| 3,341,339 | A | * | 9/1967 | Stein .............................. 501/124 |
| 3,865,923 | A | | 2/1975 | Stephens |
| 3,905,917 | A | * | 9/1975 | Nishino et al. ................ 502/241 |
| 3,928,238 | A | | 12/1975 | Koberstein et al. |
| 4,049,583 | A | | 9/1977 | Lauder |
| 4,212,854 | A | * | 7/1980 | Maki et al. .................... 423/247 |
| 4,299,734 | A | * | 11/1981 | Fujitani et al. ................ 502/304 |
| 4,350,613 | A | | 9/1982 | Nishino et al. |

(Continued)

FOREIGN PATENT DOCUMENTS

| CA | 2 036 385 A1 | 1/1991 |
|---|---|---|
| DE | 37 05 793 A1 | 11/1987 |

(Continued)

OTHER PUBLICATIONS

McMurry, J. et al., *Chemistry*, Prentice Hall, Englewood Cliffs, New Jersey (p. G10) 1995.

*Primary Examiner* — Kaity V. Handal
(74) *Attorney, Agent, or Firm* — Leydig, Voit, & Mayer, Ltd.

(57) ABSTRACT

The reduction of nitrogen oxides in gas is carried out, by means of selective reaction of the nitrogen oxide with the reducing agent in the in the solid catalyst. In order to achieve high catalytic activity, the above is carried out at high gas temperatures. As a rule, ceramic filter elements, coated with catalytic material are used. This does, however, give rise to the risk the catalytically active components are stripped from the filter during the hot gas filtration. A ceramic filter element with support material in the form of particles, with binder material and catalytic material is thus disclosed, whereby the binder material comprises catalytic material, or the binder material is partly replaced by the catalyst material and the support material particles (1) are connected to each other by means of the catalyst and/or binder material.

14 Claims, 1 Drawing Sheet

U.S. PATENT DOCUMENTS

| | | |
|---|---|---|
| 4,420,316 A | 12/1983 | Frost et al. |
| 5,100,859 A | 3/1992 | Gerdes et al. |
| 5,141,714 A | 8/1992 | Obuchi et al. |
| 5,195,319 A | 3/1993 | Stobbe |
| 5,294,411 A | 3/1994 | Breuer et al. |
| 5,645,804 A | 7/1997 | Sumiya et al. |
| 5,736,109 A | 4/1998 | Howorth et al. |
| 5,849,250 A | 12/1998 | Timko |
| 5,877,369 A * | 3/1999 | Wu et al. ............ 585/419 |
| 6,417,136 B2 * | 7/2002 | Cheung et al. ........ 502/330 |
| 6,458,741 B1 * | 10/2002 | Roark et al. .......... 502/303 |
| 6,464,881 B2 * | 10/2002 | Thoraval ............. 210/652 |

FOREIGN PATENT DOCUMENTS

| | | |
|---|---|---|
| DE | 36 34 360 A1 | 3/1988 |
| DE | 39 22 909 A1 | 1/1991 |
| EP | 0 470 659 A1 | 2/1992 |
| JP | 58-27655 A | 2/1983 |
| JP | 60-51541 A | 3/1985 |
| JP | 61-86944 A | 5/1986 |
| JP | 62-027041 A | 2/1987 |
| JP | 03-143530 A | 6/1991 |
| JP | 03-169326 A | 7/1991 |
| JP | 07-251017 A | 10/1995 |
| JP | 10-76159 A | 2/1998 |
| JP | 10-121114 A | 5/1998 |
| JP | 10-137596 A | 5/1998 |
| JP | 11-509287 A | 8/1999 |
| WO | WO 90/12950 A1 | 11/1990 |
| WO | WO 98/03249 A1 | 1/1998 |

* cited by examiner

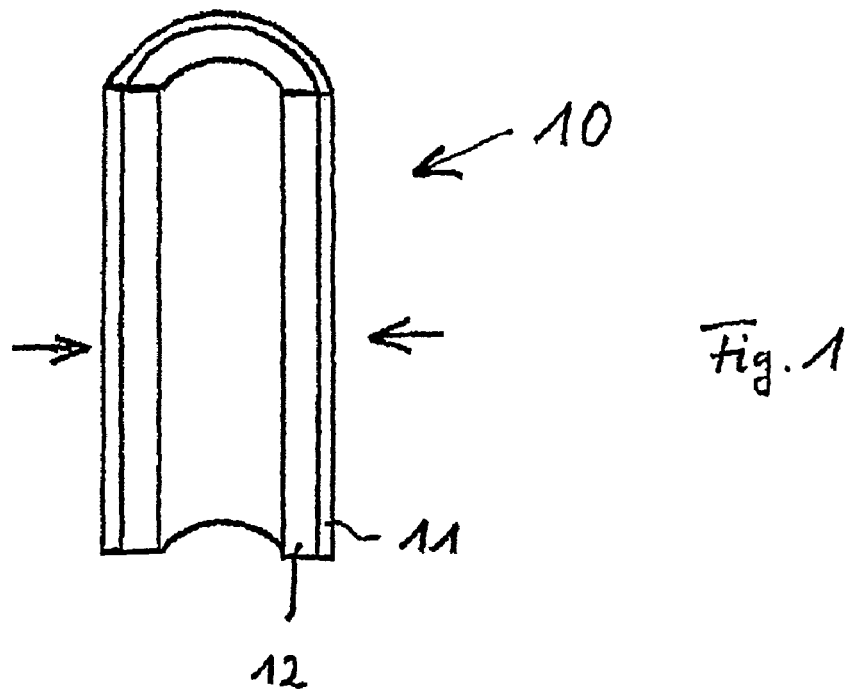
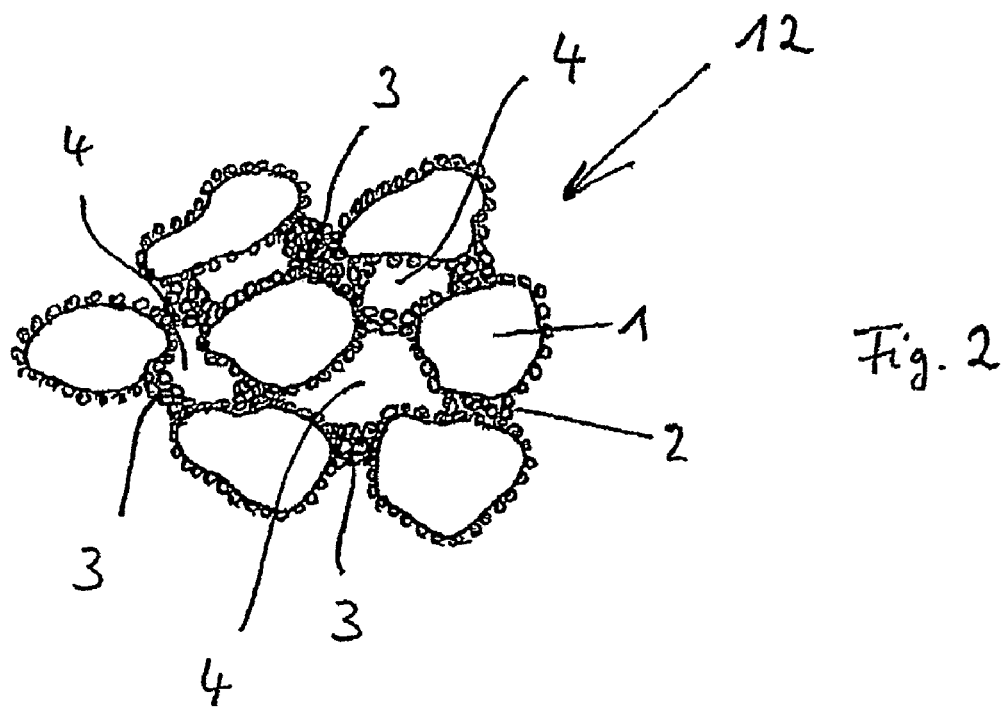

CERAMIC FILTER ELEMENT

CROSS-REFERENCE TO RELATED APPLICATIONS

This application is a continuation of U.S. patent application Ser. No. 10/332,582, now abandoned, which is a U.S. national stage application of PCT/EP/01/08171, filed Jul. 13, 2001, which claims priority to DE 10034045, filed Jul. 13, 2000.

BACKGROUND OF THE INVENTION

The invention relates to a ceramic filter element, in particular a filter candle or filter tube. The invention also relates to a method for the manufacture of such filter elements.

The reduction of nitrous oxides from gases is carried out by selective reaction of the nitrous oxides with the reduction media in solid catalytic converters. In order for an adequate catalytic activity to be attained, and in order to exclude the depositing of salt on the surface of the catalyst, so leading to its deactivation, correspondingly high gas temperatures are required. For example, reduction catalytic converters are used for waste gas purification in power stations in the waste gas flow between the boiler and the air pre-heater at temperatures of some 300° C. to 350° C.

The ceramic catalyst material is in this situation arranged in most cases in the form of rigid plates or honeycomb bodies, but in part also in the form of bulk deposit layers.

With what is referred to as the Low-Dust method, located upstream of the honeycomb body or plate catalytic converter is a hot-gas electric filter for substantial separation of the dust. With what is referred to as the High-Dust method, the gas passes the reactor, filled with a catalyst, without prior dust extraction. The individual catalyst elements must be provided with correspondingly large free flow channels for the gas, in order to avoid blockages.

The method variants mentioned have the feature in common that, for the nitrous oxide separation, in addition to the apparatus and devices already present, further large-volume and elaborate apparatus is added for the precipitation of other contaminant and pollutant components. An elaborate gas purification technique of this type is particularly disadvantageous if the treatment of comparatively small gas flows is concerned.

It is therefore proposed in DE 36 34 360 that the gases containing nitrous oxides are mixed with the reaction medium and that the mixture is conducted through at least one filter element having catalytic effect, which consists of a ceramic carrier material and the catalytic effect substances. The catalytic effect filter element is also used for extracting dust from the gases containing nitrous oxides. The filter element consists either of felts or non-woven fleece materials, which are manufactured from fibres of the ceramic carrier material by compaction and have been doped with the catalytic effect substances, or of porous sinter bodies, which are manufactured from granules of the ceramic carrier material by sintering and have been doped with the catalytic effect substances. The filter element may exhibit the form of a filter candle or filter element. The doping of the ceramic carrier material in the catalytic effect substances is effected by these substances being applied onto the ceramic carrier material before, during, or after the manufacture of the felts, non-woven fleeces, or sinter bodies. This can be done, for example, by impregnating the filter elements with salt solution and subsequent heating of the filter elements doped with the salts.

From DE 37 05 793 a filter device for gas purification is known which exhibits a single tubular body made of heat-resistant foam ceramics, which simultaneously has the effect of a dust filter and, with the appropriate coating, as a catalytic converter.

In EP 0 470 659 a method is described for the separation of dust and organic compounds from oxygen-containing gases, in particular from combustion waste gases. In this situation, the waste gas which is to be purified is conducted through at least one filter element functioning as a catalytic converter, which is composed of a ceramic carrier material and the substances functioning as catalysts. The filter element may consist of a porous sinter body, which is manufactured from granules of ceramic carrier material by sintering and has been doped with the catalytically effective substances.

WO 9012950 describes a Diesel soot filter, which consists of honeycomb bodies, of which the first honeycomb body is provided with a first surface layer which, in an inherently known manner, has the effect of catalytically converting the nitrous oxides and carbon monoxide into nitrogen or carbon dioxide respectively, while the second honeycomb bodies are provided with a second surface layer and in an inherently known manner catalytically cause a reduction of the ignition temperature of the soot adhering here.

From WO 9803249 a gas purification device in the form of a filter candle is known. The filter candle exhibits on the outside a membrane layer of ultra-fine silicon carbide particles, in order to filter out dust particles. A catalytically effective layer of sintered silicon carbide powder follows in the direction of flow inwards. As the catalytic converter, a vanadium-titanium compound is provided for, with which the silicon carbide filter is impregnated. The filter candle is created by a subsequent coating of a porous element, which has the disadvantage that the porous layer cannot be applied entirely uniformly in the pore area, and therefore the distribution of the catalyst material is not homogenous. In addition to this, there is the problem of the adherence of the applied layer to the silicon carbide particles, whereby an added difficulty is that, in the area of the hot-gas filtration, temperature fluctuation stresses occur, which can encourage the separation of the coating.

It is therefore the problem of the invention to provide a ceramic filter element which can be used for hot-gas filtration, exhibits a high degree of efficiency, and with which the risk does not arise of the catalytically effective components become detached from the filter.

This problem is resolved with a ceramic filter element which, according to a first embodiment, is characterised in that the bonding material exhibits catalyst material or is at least in part replaced by catalyst material, and that the support material particles are connected to one another by means of the catalyst material and/or the bonding material.

BRIEF SUMMARY OF THE INVENTION

In order for the support material particles to be bonded to one another by means of the catalyst materials and/or the bonding materials, the distance between the support material particles is greater than with filter elements with which the support material particles are first sintered and the bonding/catalyst materials are then introduced. The bonding/catalyst materials form for preference web-type connections between the support material particles, whereby free spaces remain between the webs to allow the passage of the gas which is to be filtered. In addition, per volume unit there is more catalyst material available in the filter element, as a result of which the degree of efficiency of the filter element is additionally increased in comparison with conventional filter elements.

The invention relates to a ceramic filter element, in particular a filter candle or filter tube. The invention also relates to a method for the manufacture of such filter elements.

BRIEF DESCRIPTION OF THE SEVERAL VIEWS OF THE DRAWINGS

FIG. 1 represents a filter candle or tube 10 in a vertical section. The filter candle or tube 10 has a first external coating 11 for particle separation, and a second internal layer 12, which forms the support body. The direction of flow is indicated with arrows.

FIG. 2 shows an enlarged section from the second layer 12. The support material particles 1 exhibit an irregular shape and are arranged at distances from one another. These particles 1 are connected to one another by means of the particles 2, consisting of catalyst and bonding material, which form web-like bridges 3. Between the web-like bridges 3 free spaces 4 remain for the passage of the gas which is being filtered, whereby the free spaces are represented enlarged for the purpose of clarity. The particles 2 represented here in diagrammatic form are compound particles of catalyst and bonding agent material.

DETAILED DESCRIPTION OF THE INVENTION

Surprisingly, it has been found that, with this structure, the detachment of the catalytic components is prevented.

The degree of efficiency of the filter element is further increased by the fact that the bonding material exhibits either catalyst material or is partly replaced by catalyst material.

In the structure according to the invention, the catalyst material simultaneously takes on a bonding function for the support material particles, so that it is possible to do without a pure bonding material in whole or in part. The catalyst material can be increased to the degree to which the bonding material is reduced.

To advantage, the catalyst and bonding materials are present as composite particles. These composite particles can consist of 90 to 99% by weight of catalyst material and the remainder of bonding material.

The catalyst material is already incorporated at the time of manufacture of the ceramic filter element, as a result of which a homogenous distribution of the catalyst material in the filter element is attained. As a result, the degree of efficiency of the filter element is likewise increased in comparison with conventional ceramic filter elements.

For preference, the catalyst material consists of oxides of the rare earths, of aluminates, of silicates, of titanates, or of titanium dioxide, or, for special preference, of calcium aluminate. In this situation, one substance of the substances cited may be concerned, or mixtures of several substances, each from one of the substance classes named, or mixtures of substances from several of the substance classes named.

For preference aluminates, titanates, or titanium dioxide is used, if the bonding material is entirely replaced by the catalyst material. Other catalyst materials are likewise suitable.

As bonding material, conventional materials are used, such as, for example, kaolin, flux agents, or clay.

In this context it may be of advantage for an adherence agent to be added to the catalyst material in turn, which consists for preference of a flux.

It has proved to be of particular advantage if the catalyst material is modified with promoters, or, if the catalyst material consists of a mixture of substances of the substance classes referred to heretofore, at least one of these substances is modified with promoters.

As support material for the support bodies, the known materials SiC, mullite, or aluminum oxide are used.

For preference, the proportion of the support material amounts to 60 to 90% by weight and that of the catalyst/bonding material 10 to 40% by weight. To advantage, the proportion of the support material is about 65 to 75% by weight, and that of the catalyst bonding material 25 to 35% by weight. By way of example, the support material may consist of SiC or $Al_2O_3$, the catalyst material of calcium aluminate, and the bonding material of clay.

For preference, the catalyst material is located only in the second layer of the filter element.

The method for the manufacture of such a filter element, in which the support body is manufactured first and then the layer for the particle separation is applied onto the support body, is characterised in that the bonding material is mixed fine-grained and homogenously with the catalyst material in each case, that this mixture is then mixed with the support material, and that this resultant mixture is then introduced into a mould for the manufacture of the support body and sintered.

If the whole of the bonding material is replaced by catalyst material, this catalyst material is mixed with the support material and the moulding and sintering carried out in an analogous manner.

A further variant of the manufacturing method makes provision for composite particles to be manufactured from bonding material and catalyst material, and that these composite particles are then mixed with the support material. To manufacture the support body, the resultant mixture is introduced into the mould and sintered.

A further embodiment makes provision for at least one source material in powder form or at least one source material present in a solution, which under the effects of heat form catalyst and/or bonding properties, being mixed with the support material, and that the resultant mixture is placed in a mould and sintered for the manufacture of the support body. As powder-form source materials, for example, calcium oxide and aluminum oxide are well-suited, from which calcium aluminate is formed.

From these source materials, in the first instance, the catalyst material is formed during the sintering of the filter element by chemical reactions. These source materials may contain both substances from which the catalyst material forms, as well as the bonding material.

From among the source materials which are present in solution, calcium nitrate and aluminum nitrate are particularly well-suited, from which calcium aluminate forms. It is possible, for example, for aqueous nitrate solutions to be used for the manufacture of the source materials. The solutions with the source materials are then mixed together with the bonding material into the support body. The catalyst material is formed during the sintering of the mould body.

At sintering temperatures of between 1255 and 1350° C., for example, and for preference at 1300° C., the support material particles do not sinter with one another. Only by the sintering of the bonding and/or catalyst material, in particular of the bonding particles, will the holding effect of the support material particles be achieved.

According to a second embodiment, the problem is resolved by a ceramic filter element which is characterised in that the support material is replaced at least in part by the catalyst material.

For preference the catalyst material consists of one or several aluminates, of one or several titanates, or of titanium dioxide.

According to a further embodiment, the catalyst material consists of one or more oxides or mixed oxides of the rare earths, with which the support material grains are coated.

It has also transpired to be of advantage if the catalyst material consists of a mixture of at least one oxide or mixed oxide of the rare earths and at least one aluminate, a titanate, or titanium oxide.

The method for the manufacture of such a ceramic filter element according to the second embodiment makes provision for three different method options.

According to a first variant:
a) Support material and catalyst material are used jointly for the manufacture of the support body, whereby both materials are present in fine-grain form and are mixed.

According to the second variant:
b) Only conventional support material is used which is present in fine-grain form, whereby the support material grains are coated with one or more oxides or mixed oxides of the rare earths and/or with one or more aluminates, one or more titanates, or titanium dioxide.

According to the third variant:
c) Only catalyst material is used which is likewise present in fine-grain form.

To manufacture the support body, these materials, prepared in this manner, are then sintered.

The coating according to method step b) is carried out for preference by means of the sol-gel method. In this context, the support material grains can be sprayed with the sol in a mixer. The advantage of this method lies in the fact that the excellent thermal shock resistance of silicon carbide, which is used for preference for the support material, is exploited, and an economical and uniform coating of the original grain is achieved before the burning of the filter element with catalyst. It is likewise of advantage, if selecting method step b), for the coating to be carried out by spraying on the ceramic mud. This is done for preference by the support material grains being sprayed with the ceramic mud in a mixer.

In method step c), for preference two grain fractions are used, which are mixed with each other, whereby a fine-grain sintering is carried out with reduced burn temperature. The bonding of the carrier body constructed directly from catalyst material is therefore carried out by means of an inherent bonding process, in order to avoid the wetting of the catalytically active surface by an additional bonding agent. In order to reduce the burn temperature, fine grain sintering is therefore chosen as the bonding, which is achieved by mixing in a fine fraction of the same material.

In method steps a) or b), it is also possible for the support material grains to be additionally doped with catalytically-active noble or non-noble metals. For preference this takes place after the sintering. After the sintering it is also possible for the catalyst material grains to be doped with catalytically-active noble or non-noble metals (method steps a), b), c)). As materials for the doping; particular consideration can be given to platinum, palladium, rhodium, gold, silver, nickel, copper, manganese, or cobalt. The doping serves to provide the additional achieved increase in catalytic activity and selectivity for special chemical reactions.

The modification of the catalyst material can be effected by wet-chemical doping methods or gas-phase coating methods.

According to a third embodiment, the problem is resolved by a filter candle or tube.

A filter candle or tube according to the invention can be manufactured by the cylindrical mould body, closed on one side, of a conventional filter candle or tube being filled with a deposit of catalyst material, and the open side of the mould is closed, so that the catalyst deposit is not carried out. It has proved advantageous in this context if the closure is formed as a porous ceramic layer.

As catalyst materials, there come into consideration oxides or mixed oxides of the rare earths, aluminates, silicates, titanates, and titanium dioxide. In this situation, the catalyst material may consist of a single substance, of several substances from one of the substance classes referred to heretofore, or of a mixture of substances from different substances classes as referred to heretofore. Of particular preference in this situation is the use of calcium aluminate.

It has transpired to be advantageous if the catalyst material is modified with promoters. In particular, a high effect of the filter candle according to the invention is achieved if the catalyst material is doped with catalytically-active noble or non-noble metals. As doping materials, particular preference is given to platinum, palladium, rhodium, gold, silver, nickel, copper, manganese, or cobalt.

The advantage of the invention lies in the fact that catalytically-active ceramic filter elements are obtained which are resistant to high temperature, resistant to steam, and resistant to hetero-element compounds. They can therefore be arranged directly in the hot smoke or waste gases flow, and at the same time guarantee the removal of dust from the hot gas as well as the total conversion of organic pollutants and residual components. In addition to the gas purification effect, the substance foundation for the formation of dioxins is therefore also removed (DeNovo synthesis).

The catalytic design of the filter elements may contain the bi-functional effect of the catalyst system, i.e. the total oxidation or the thermal-catalytic splitting, and therefore the subsequent reactions, which depend on the catalyst material used in each case, or the doping material used, as appropriate.

Catalytic reduction of nitrous oxides, catalytic cracking of long-chain hydrocarbons, catalytic decomposition of easily-evaporable organic compounds, total oxidation of carbon and carbon compounds, etc.; the catalytic effect of the filter elements is not restricted to these areas of application, however.

Typical wall thicknesses of the inner support body of the filter candle are between 10 and 15 mm. The application temperatures of the filter candles according to the invention range up to 1000° C.

For the first layer which serves for the particle separation, and is also designated as the membrane layer, whereby this membrane layer is not catalytically active, mullite grain is used as a standard material, although other materials can also be used. In general, all ceramic oxides, nitrides, and carbides are suitable.

The membrane layer can be an asymmetrical membrane layer formed from several layers. The membrane layer thickness can measure up to 200 μm, whereby the pore size is between 0.05 to 40 μm. The membrane layer is manufactured from bonded inert grain or from fine particles manufactured by means of polymer sol-gel methods. As coating methods, consideration may be given to spraying, electrophoresis, film casting, mud casting, or the sol-gel method.

The invention claimed is:
1. A ceramic filter element for hot-gas filtration, comprising:
a first layer in the flow direction for particle separation and
a second layer providing a support body, wherein the support body comprises
support material particles selected from the group consisting of SiC, mullite, and aluminum oxide,
bonding material, and catalyst material, the catalyst material being selected from the group consisting of one or more oxides of rare earth metals, one or more aluminates, titanates, and $TiO_2$, and the catalyst material being doped with a promoter, the promoter being selected from the group consisting of platinum, palladium, rhodium, gold, silver, nickel, copper, manganese and cobalt, wherein the support body, including the support material particles, the bonding material, and the catalyst material, is a sintered support body, and the support material particles are bonded to one another at least partly by the catalyst material, and the catalyst and bonding materials are present as composite particles comprising 90-99% by weight catalyst material and a remainder of bonding material.

2. The filter element according to claim 1, wherein the catalyst material comprises one or more oxides of the rare earth metals and/or one or more aluminates.

3. The filter element according to claim 1, wherein the catalyst material comprises one or more aluminates, one or more titanates, or titanium dioxide.

4. The filter element according to claim 2, wherein the catalyst material comprises calcium aluminate.

5. The filter element according to claim 1, wherein the catalyst material comprises an adherence agent.

6. The filter element according to claim 1, wherein the support body comprises 60-90% by weight of support material particles and 10-40% by weight of catalyst/bonding material.

7. The filter element according to claim 6, wherein the support body comprises 65-75% by weight of support material particles and 25-35% by weight of catalyst material.

8. The ceramic filter element according to claim 1, wherein the support material particles comprise SiC.

9. The ceramic filter element according to claim 1, wherein the support material particles comprise mullite.

10. The ceramic filter element according to claim 1, wherein the support material particles comprise aluminum oxide.

11. The ceramic filter element according to claim 1, wherein the catalyst material comprises one or more oxides of rare earth metals.

12. The ceramic filter element according to claim 1, wherein the catalyst material comprises one or more aluminates.

13. The ceramic filter element according to claim 1, wherein the catalyst material comprises one or more titanates.

14. The ceramic filter element according to claim 1, wherein the catalyst material comprises $TiO_2$.

* * * * *